United States Patent [19]
Winbush

[11] Patent Number: 5,652,564
[45] Date of Patent: Jul. 29, 1997

[54] BOLD THIEF SECURITY SYSTEM

[76] Inventor: Solomon Lanair Winbush, 2193 Chevy Chase La., Decatur, Ga. 30023

[21] Appl. No.: 507,145

[22] Filed: Jul. 26, 1995

[51] Int. Cl.⁶ ................................................. B60R 25/10
[52] U.S. Cl. ................... 340/426; 340/539; 340/825.69; 307/10.3; 455/346; 455/420
[58] Field of Search ......................... 340/425.5, 426, 340/539, 825.69, 825.72; 307/10.3, 10.5; 379/58, 59, 57; 455/70, 88, 346, 352

[56] References Cited

U.S. PATENT DOCUMENTS

| | | | |
|---|---|---|---|
| 5,276,728 | 1/1994 | Pagliaroli et al. | 340/426 |
| 5,307,048 | 4/1994 | Sonders | 340/426 |
| 5,382,948 | 1/1995 | Richmond | 340/340 |
| 5,432,495 | 7/1995 | Tompkins | 340/426 |

*Primary Examiner*—Jeffery Hofsass
*Assistant Examiner*—Daniel J. Wu
*Attorney, Agent, or Firm*—Michael I. Kroll

[57] ABSTRACT

A bold thief security system is provided that allows a user to remotely disable a vehicle that has been carjacked. Three methods are provided to contact a control unit mounted in the vehicle. One method uses a pager to send a code to the control unit. The second method uses a wrist watch with a built-in transmitter. The third method uses a conventional cellular telephone connected to the control unit so that a telephone can be used to disable the vehicle via a coded phone call. The bold thief security system helps the victim to quickly recover the stolen vehicle while not endangering his own security.

3 Claims, 2 Drawing Sheets

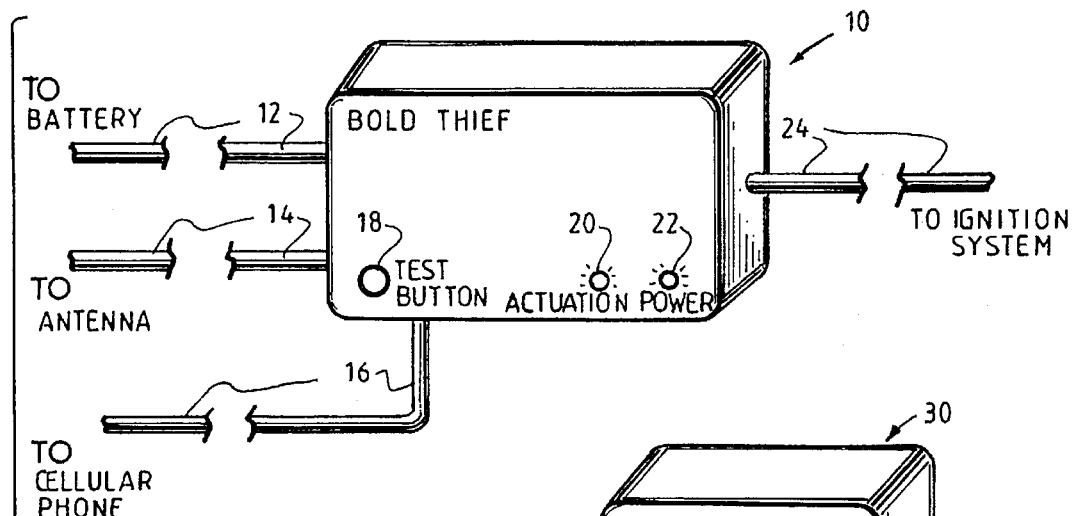
Fig. 1
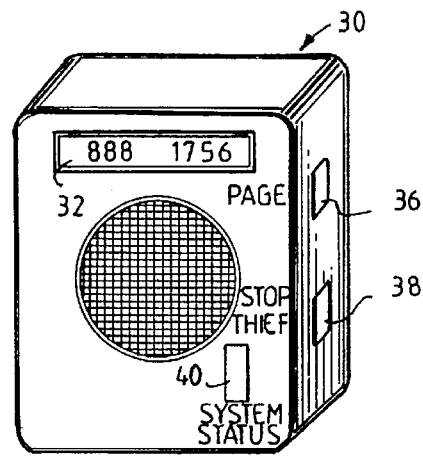
Fig. 2
1. DIAL CELLULAR PHONE NUMBER TO COMMUNICATE WITH BOLD THIEF SECURITY SYSTEM.
2. DIAL ACTIVATION CODE TO INITIATE ENGINE SHUTDOWN.
3. -OR- DIAL DEACTIVATION CODE TO CANCEL ENGINE SHUTDOWN.
Fig. 3
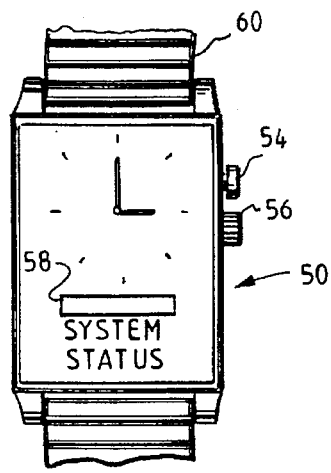
Fig. 4

1

BOLD THIEF SECURITY SYSTEM

BACKGROUND OF THE INVENTION

The instant inventions relates, generally, to the field of automotive security systems, and, more specifically, to systems that can be remotely activated.

At present, automotive theft has grown to be a major problem. A new, and more dangerous form of auto theft, carjacking, has become a particular problem. During a carjacking, a bold thief approaches the driver with a weapon and orders the driver out of the vehicle. The bold thief then steals the vehicle. If the vehicle owner objects or does not exactly obey the thief, the owner is subject to injury or death.

Existing vehicle security systems are designed to thwart the unauthorized entrance or use of a vehicle that is presumed to be parked and unattended. Current systems set off alarms to frighten the unauthorized intruder and often disable the vehicle so it cannot be driven away. In a carjacking, the vehicle is available for entry and is already fully operative. While the vehicle owner has an interest in the speedy recovery of the stolen vehicle, it is in the best interests of the owner not to do anything which might anger the thief while the owner is physically present.

Numerous vehicle security systems have been provided in prior art that are adapted to be utilized by scuba divers which need to be stored in convenient places, so that the equipment is near at hand. While these units may be suitable for the particular purpose to which they address, they would not be as suitable for the purposes of the present invention as heretofore described.

SUMMARY OF THE INVENTION

It is, therefore, a primary object of the present invention to provide a bold thief security system that allows the thief to leave the scene of a carjacking with the vehicle, but then allows the vehicle owner to remotely disable the vehicle.

Another object is to provide a bold thief security system, which allow the user to remotely disable the vehicle by pressing a STOP THIEF button on a pager.

Yet another object is to provide a bold thief security system, which allow the user to remotely disable the vehicle by pressing a STOP THIEF button on a wrist watch.

Still another object is to provide a bold thief security system, which allow the user to remotely disable the vehicle by dialing a STOP THIEF code on his telephone which is received by a cellular telephone located in the stolen vehicle.

A yet further object is to provide a bold thief security system, which is simple and relatively inexpensive to install in a conventional vehicle.

Another further object is to provide a bold thief security system which is activated after some predetermined delay when activated by the pager or the watch, but is activated immediately when activated by a telephone call.

Another further object is to provide a bold thief security system that allows the vehicle to resume normal operation when the normal mode is resumed via a telephone call.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is an illustration of the under-the-dash mounted controller.

FIG. 2 is an illustration of a pager used to activate the system.

FIG. 3 is the operational sequence utilizing cellular phone communications to activate the system.

FIG. 4 is an illustration of a wrist watch used to activate the system.

DETAILED DESCRIPTION OF THE PREFERRED EMBODIMENTS

Figure 5:
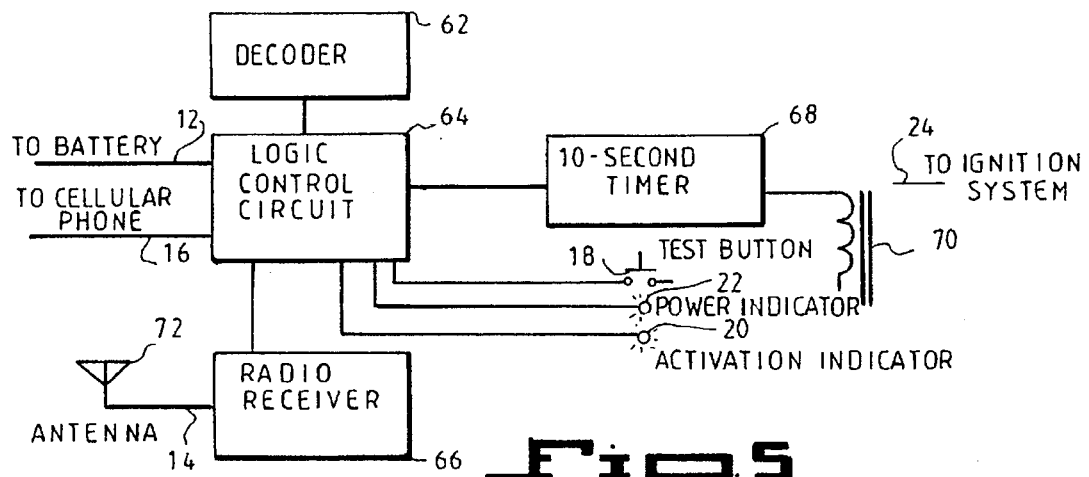
FIG. 5 is an electronic block diagram of the under-the-dash mounted controller.

FIG. 1 illustrates the control unit 10 which is normally mounted under the dashboard of a vehicle or in the engine compartment. The electronic operation of the control unit 10 is illustrated in FIG. 5. The control unit 10 receives power from the vehicle battery through cable 12. Control unit 10 contains a radio receiver 66 which receives radio signals from antenna 72 via cable 14. In operation, a coded STOP THIEF radio signal is received by antenna 72 and sent via cable 14 to radio receiver 66. Decoder 62 determines if the coded signal is from an authorized source. The output of decoder 62 is input to logic control circuit 64 which initiates the vehicle disabling process. If the STOP THIEF code was sent by pager 30 or wrist watch 50 a 10-second timer 68 delays the vehicle disabling process. To disable the vehicle, solenoid 70 changes the electrical state of wire 24 which is connected to the vehicle ignition system.

A conventional cellular telephone is also connected to logic control circuit 64 via cable 16. If a STOP THIEF coded message is received through cable 16, decoder 62 determines if the coded signal is from an authorized source. The output of decoder 62 is input to logic control circuit 64 which initiates the vehicle disabling process. Since it is assumed that the telephone call was made from a safe distance, the vehicle disabling process begins immediately as. Once the vehicle has been disabled, it can be placed back in normal operation by telephoning again, this time using a reactivation code.

On the control unit 10, a test button 18 is provided. When this button is depressed, the vehicle is temporarily disabled to prove that the system is operating. Actuation light 20 glows when the vehicle is disabled. Power light 22 glows whenever power is applied to control unit 10.

Figure 6:
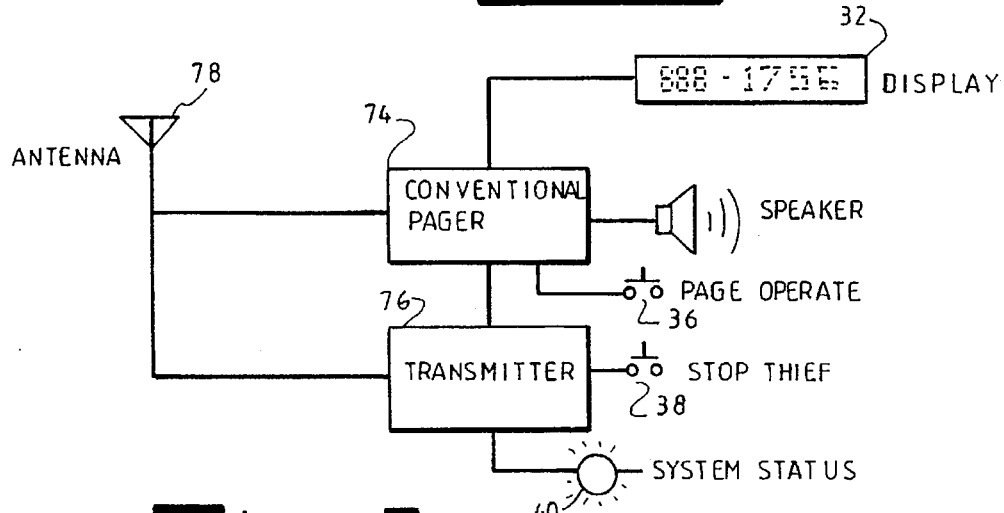
FIG. 6 is an electronic block diagram of the pager.

The pager 30 used with the bold thief security system is illustrated in FIGS. 2 and 6. Many of the pager features are conventional including conventional pager circuit 74, display 32, page operate button 36, transmitter circuit 76, and antenna 78. The pager used with the bold thief security system further comprises a stop thief button 38 which, when depressed, transmits a specially coded STOP THIEF signal and a system status light 40 which only glows when the STOP THIEF button 38 is depressed. When STOP THIEF BUTTON 38 is depressed, a coded radio signal is transmitted via antenna 78, thereby initiating the vehicle disabling process when the signal is received by control unit 10.

Figure 7:
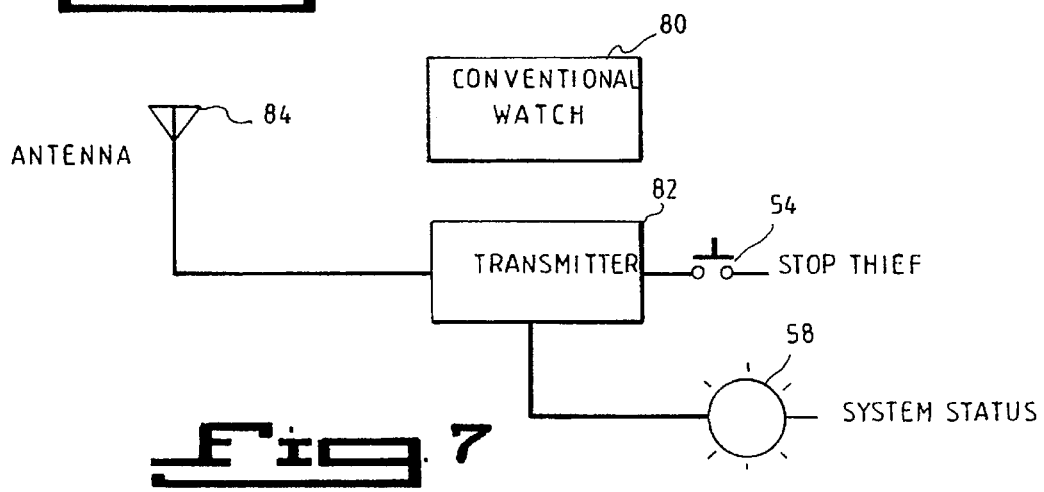
FIG. 7 is an electronic block diagram of the wristwatch.

The wrist watch 50 used with the bold thief security system is illustrated in FIGS. 4 and 7. Many of the wrist watch features are conventional including wrist band 60, and stem. The wrist watch used with the bold thief security system further comprises a transmitter 82, an antenna 84, a STOP THIEF button 54, and a system status display 58.

When STOP THIEF button 54 is depressed, transmitter 82 outputs a coded radio signal, which is transmitted via antenna 84, thereby initiating the vehicle disabling process when the signal is received by control unit 10. System status display 58 shows that the STOP THIEF mode has been employed.

LIST OF REFERENCE NUMERALS UTILIZED IN THE DRAWINGS

10 Control Unit
12 Controller Battery Cable
14 Controller Antenna Cable
16 Controller Cellular Phone Cable
18 Controller Momentary Contact Test Button Switch
20 Controller Activation Status Lamp
22 Controller Power On Lamp
24 Controller Ignition Disable Cable
30 Pager/Transmitter
32 Pager Display
34 Pager Speaker
36 Pager Page Button
38 Pager Stop Thief Momentary Contact Switch
40 Pager Activation Status Lamp
50 Wrist Watch
52 Wrist Watch Dial
54 Wrist Watch Stop Thief Momentary Contact Switch
57 Wrist Watch Time Set Stem
58 Wrist Watch Activation Status Lamp
60 Wrist Watch Band
62 Controller Decoder Circuit
64 Controller Logic Control Circuit
66 Controller Radio Receiver
68 Controller 10-Second Timer Circuit
70 Controller Ignition Disable Solenoid
72 Controller Antenna
74 Pager Conventional Components
76 Pager Transmitter
78 Pager Antenna
80 Wrist Watch Conventional Components
82 Wrist Watch Transmitter
84 Wrist Watch Antenna It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A bold thief security system comprising:
   a) electronic control means mounted within said vehicle for disabling said vehicle upon being actuated comprising radio receiver means for receiving a radio signal containing a message, decoder means for determining if said message is from an authorized source, and logic control circuit means in response to an appropriate signal from said decoder means for initiating the vehicle disabling process;
   b) remote means for sending a disabling message for receipt by said radio receiver means incorporating button operated means for sending a signal recognized by said decoder means for activating said logic control circuit means to initiate said disabling process;
   c) means for introducing a delay in the disabling process upon receipt of a message from said remote means;
   d) remote cellular telephone means for sending a coded signal; and
   e) said logic circuit means including means to receive signals directly from said remote cellular telephone means to initiate said disabling process without a delay if said decoder determines that said signal is from an authorized source.

2. The bold thief security system of claim 1 in which said remote means is a pager having the additional capability of issuing a coded signal received and recognized by said radio receiver means.

3. The bold thief security system of claim 1 in which said remote means is a wrist watch.

* * * * *